United States Patent [19]

Medernach

[11] Patent Number: 5,005,346
[45] Date of Patent: Apr. 9, 1991

[54] CROP LIFTER FOR SWATHERS OR COMBINES

[75] Inventor: Louis J. Medernach, Saskatchewan, Canada

[73] Assignee: Eagle Air Ltd., Saskatchewan, Canada

[21] Appl. No.: 461,426

[22] Filed: Jan. 5, 1990

[30] Foreign Application Priority Data

Jan. 16, 1989 [CA] Canada .................................. 590679

[51] Int. Cl.$^5$ ............................................ A01D 55/10
[52] U.S. Cl. ......................................... 56/312; 56/313
[58] Field of Search .......................... 56/312, 313, 307

[56] References Cited

U.S. PATENT DOCUMENTS

| 2,960,814 | 11/1960 | Babcock | 56/312 |
|---|---|---|---|
| 3,163,975 | 1/1965 | Lightsey | 56/313 |
| 3,579,967 | 5/1971 | Schumacher | 56/313 |
| 3,834,139 | 9/1974 | Schumacher, II et al. | 56/313 |
| 4,120,138 | 10/1978 | Schumacher, II et al. | 56/313 |
| 4,295,328 | 10/1981 | Schumacher, II; et al. | 56/313 |
| 4,490,967 | 1/1985 | Mills | 56/312 |
| 4,702,064 | 10/1937 | Hunter et al. | 56/312 |

FOREIGN PATENT DOCUMENTS

| 372401 | 3/1938 | Canada . |
|---|---|---|
| 395273 | 3/1941 | Canada . |
| 407654 | 9/1942 | Canada . |
| 454362 | 2/1949 | Canada . |
| 531987 | 10/1956 | Canada . |
| 548220 | 11/1957 | Canada . |
| 719825 | 10/1965 | Canada . |
| 751113 | 1/1967 | Canada . |

*Primary Examiner*—Thuy M. Bui
*Attorney, Agent, or Firm*—Irell & Manella

[57] ABSTRACT

Conventionally, such lifters are relatively long and cause problems with control of the header and proper lifting of the crops without shattering or shelling occurring. The present lifter is relatively short and is bolted to the header using one the bolts attaching the knife guard to the header. The head is floating so that the lifter rides just on the surface and just in front of the guard so that it picks up the crop and lifts them over the knife assembly and onto the header.

12 Claims, 1 Drawing Sheet

CROP LIFTER FOR SWATHERS OR COMBINES

BACKGROUND OF THE INVENTION

This invention relates to new and useful improvements in crop lifters, particularly lifters used on pulse type crop vines such as peas, lentils and the like.

Conventional lifters extend forwardly a considerable distance from the knife guards and although they may be satisfactory to lift certain types of crops, nevertheless when dealing with pulse crops, the tendency of such crops to shatter and shell makes it difficult to use such long lifters. Furthermore, with the header in a floating position, such lifters tend to vibrate the crops as they are lifted and the considerable distance that they have to be engaged by the lifters often results in damage occurring to the crop prior to the cutting action of the transverse knife assembly situated on the front edge of the header. There is less danger of bending the lifters of the present invention during turning.

The present device overcomes these disadvantages by providing a relatively short and close coupled crop lifter, the forward end of which is only relatively short distance in front of the knife guards. It is used primarily to lift pulse crops such as peas and lentils off the ground for swathing or combining and the lifters are bolted onto the header using one of the bolts which attaches the knife guards so that the lifter projects forwardly and downwardly to the ground. The lifters can, of course, be used on other types of crops.

The header may then be floated so that the crop lifter just rides on the ground and picks up the crop to get them over the knife assembly and onto the header with the minimum disturbance occurring prior to the knife assembly severing the plants.

By contrast, present devices, being relatively long, cause problems of control of the header with proper lifting of the crops and some such lifters catch on the crop, particularly when backing out of a wet spot. Furthermore, bending of conventional lifters is a problem when turning.

PRIOR ART

Prior art known to the applicant includes the following patents:

U.S. Pat. No. 2,960,814, Nov. 22, 1960, M. P. Babcock. This shows a supplemental lifting finger bolted to and angulated from the knife guard with a detachable finger attached to the ground engaging portion.

U.S. Pat. No. 3,163,975, Jan. 5, 1965, A. S. Lightsey. This shows a crop lifter assembly with a ground engaging blade and an adjustable lifting finger extending upwardly from the main bar.

U.S. Pat. No. 3,834,139, Sept. 10, 1974, G. Schumacher et al. This shows a device for supporting the cutting mechanism on a harvesting machine and includes a ground engaging shoe extending forwardly from the cutter assembly with a rigid finger extending at an angle upwardly therefrom.

U.S. Pat. No. 4,120,138, Oct. 17, 1978, G. Schumacher et al. This shows a similar structure to U.S. Pat. No. 3,834,139.

U.S. Pat. No. 4,490,967, Jan. 1, 1985, D. L. Mills. This shows an apparatus for lifting crops which includes a support bar and a lifting finger with a hinging or swinging action.

Canadian patent 372,401, Mar. 8, 1938, L. W. Perau. This shows a bean pickup guard having a rigid support extending downwardly and forwardly from the knife assembly with a plate there above and a right angulated curved shield at the inner end thereof together with a lifting finger above the plate.

Canadian patent 395,272, Mar. 18, 1941, J. H. Wilcox. This shows a rigid downwardly and forwardly extending ground engaging rod with a lifting finger extending rearwardly and upwardly therefrom.

Canadian patent 407,654, Sept. 29, 1942, E. H. Young. This shows a down-grain guard for combines having a spoon at the forward end and a spring loaded telescopically adjustable rearwardly extending lifter.

Canadian patent 454,362, T.J. Caries et al. This shows a pickup guard with a pair of lifting fingers extending rearwardly and upwardly from a downwardly extending ground engaging bar.

Canadian patent 531,987, Oct. 23, 1956, A. E. Fisher. This shows a structure somewhat similar to 454,362 above.

Canadian patent 548,230, Nov. 5, 1957, A. Class. This shows a lifting guard with a spring loaded attaching means to the knife assembly.

Canadian patent 719,825, Oct. 19, 1965, A. Class. This shows a structure similar to that shown in patent 548,230 above.

Canadian patent 751,113, Jan. 24, 1967, J. Schieman. This shows a pneumatic cutter assembly for grain harvesting machines with a pickup shoe below the reel.

In accordance with the invention there is provided a crop lifter for use with a combine or swather which includes a transverse knife blade assembly on a header and a plurality of knife guards extending forwardly from the front of the header, said crop lifter including a downwardly extending ground engaging front portion and a substantially horizontal header attachment portion close coupled behind the front portion and means on said lifter to engage the front of the guard for stabilizing said lifter both vertically and horizontally.

Another advantage of the invention is to provide crop lifters that may be spaced along the length of the header for example, every 6" or 9" and may be left on the header when used with other crops without interfering with the action of the header.

A further advantage of the invention is to provide a device of the character herewithin described which is simple in construction, economical in manufacture and otherwise well suited to the purpose of which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
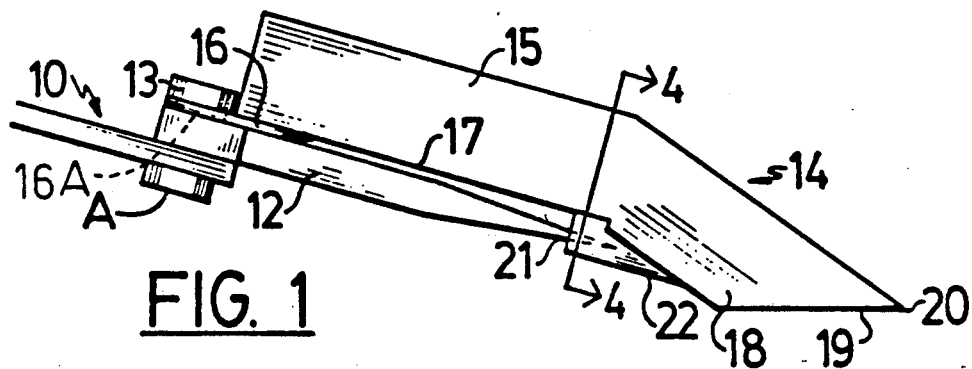
FIG. 1 is a side elevation of the device shown installed on a header.
Figure 2:
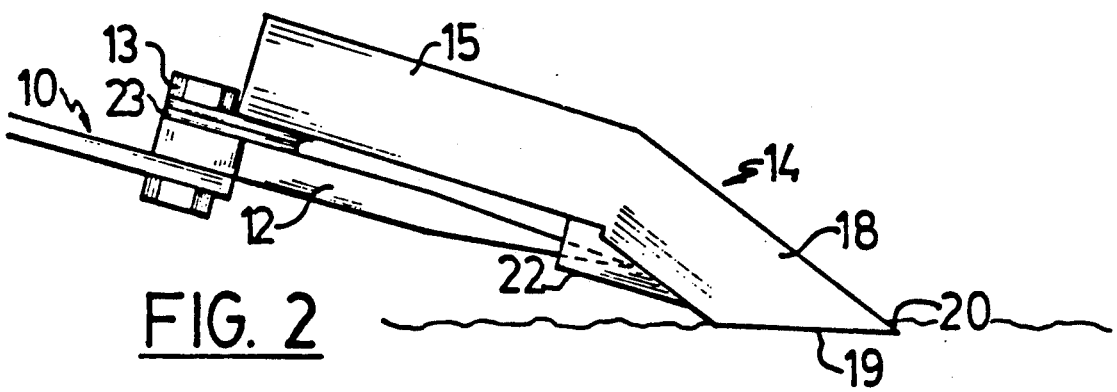
FIG. 2 is a view similar to FIG. 1 but showing the spacers used to control the aggressiveness of the crop lifter relative to the ground.
Figure 3:
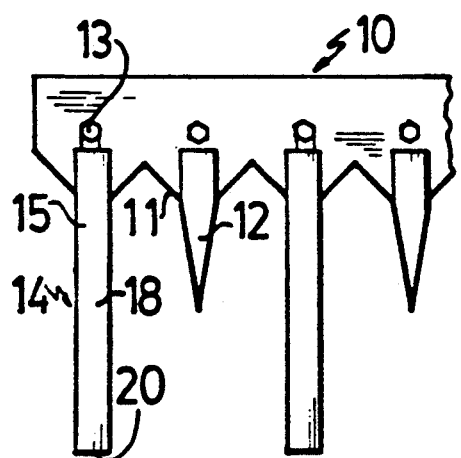
FIG. 3 is a partially schematic top plan view of FIG. 1.
Figure 4:
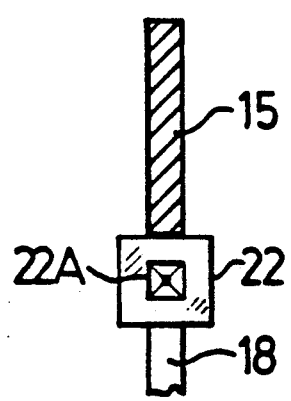
FIG. 4 is a section along the line 4—4 of FIG. 1 but with the guard removed.

Proceeding therefore to describe the invention in detail, reference character 10 illustrates generally and schematically, a conventional header used on combines or swathers. It includes a transverse reciprocal knife show schematically by reference character 11 with the knife being supported by conventional guards 12 which are bolted to the header 10 by means of bolts 13 and extend forwardly therefrom in spaced and parallel relationship.

The invention collectively designated 14 may be secured across the width of the header at approximately 6″ or 9″ intervals, by utilizing one of the bolts normally holding the guards 12 to the header; such a bolt is shown by reference character 13 as hereinbefore described.

The individual crop lifters consist of a header attaching portion 15 which is basically horizontal and which includes a flat plate 16 secured to the underside 17 of the horizontal portion and extending rearwardly therefrom. This plate is slot apertured as at (16A) and is engaged by the bolt 13 passing through the header 10 and clamping the guard 12 in position.

Extending downwardly and forwardly from the front end of the horizontal portion 15 is a ground engaging front portion 18 which angles downwardly and terminates in a planar ground engaging forward nose portion 19.

It will be noted that the forward extremity 20 of this portion is relatively close to the front end 21 of the guard 12 so that the crop is lifted over the knife assembly and onto the header with the minimum disturbance and allows very short stubble to remain after the knife has severed the crop.

The lifters are stabilized by a gusset portion 22 secured to the under side of the lifter adjacent the junction of the attaching portion (19) with the ground engaging portion 18 and this portion faces rearwardly is provided with a tapered blind aperture 22A which and engages over the front end 21 of the guard thus stabilizing and supporting the lifter both vertically and horizontally once it is bolted to the header by means of bolt 13.

The aggressiveness of the lifter may be adjusted within limits by the provision of spacers 23 situated below the flat plate 16 and above the header 10. This tilts the lifter downwardly pivoting around the gusset portion 22 and the front end 21 of the guard.

It should be appreciated that it is highly desirable to get the header as close to the ground as possible in order to leave as little stubble as possible, particularly when used for pulse crop vines and the like, a condition which is not possible with conventional relatively long lifters. These lifters also need to be relatively short for lentils, peas and the like in order to prevent shattering or shelling because conventional relatively long lifters disturb the crop too far ahead of the header thus permitting damage to the crop to occur.

Due to the relative shortness of the lifters and unlike conventional lifters, the lifters of this invention may be left on the machine when used for wheat or the like and in fact they may, under certain circumstances be useful for wheat crops and the like if the crop is wet or lying on the ground thus eliminating the need for a conventional pick up reel.

It is easily adaptable for use on most makes of combines or swathers and is readily attachable thereto.

It is also easily adapted for use with floating cutter bars and may act as a spacer so that small rocks, stones and the like pass underneath the cutter bar rather than being picked up thereby and passed to the swather or combine mechanism.

In some cases a pick-up reel may not be required when the lifters of this invention are installed and furthermore, higher swathing speeds may be attained.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A crop lifter for use with a combine or swather which includes a transverse knife blade assembly on a header and a plurality of spaced and parallel knife guards each with a front end extending forwardly from of the header, said crop lifter including a downwardly extending ground engaging front portion and a substantially horizontal header attachment portion close coupled behind the front portion and means on said lifter to engage the front end of an associated one of the guards for stabilizing said lifter both vertically and horizontally.

2. The lifter according to claim 1 in which said means to engage the front end of the associated one of the guards comprises an apertured gusset portion on an under side of the lifter between the ground engaging portion and the attaching portion, said gusset portion engaging the front end of the associated one of the guards and being supported thereby.

3. The lifter according to claim 2 which includes an apertured plate extending rearwardly of said attaching portion engageable upon an upper side of the header and bolted thereto by fastening means attaching the associated one of the guards to the header.

4. The lifter according to claim 3 which includes spacer means between said plate and said header to vary the aggressiveness of said lifter relative to a ground surface being traversed by the header and to adapt said lifter for attachment to various types of swathers.

5. The lifter according to claim 4 in which said ground engaging portion angles downwardly from the header attachment portion and includes a horizontal ground engaging under surface.

6. The lifter according to claim 3 in which said ground engaging portion angles downwardly from the header attachment portion and includes a horizontal ground engaging under surface.

7. The lifter according to claim 2 in which said ground engaging portion angles downwardly from the header attachment portion and includes a horizontal ground engaging under surface.

8. The lifter according to claim 1 which includes an apertured plate extending rearwardly of said attaching portion engageable upon an upper side of the header and bolted thereto by fastening means attaching the associated one of the guards to the header.

9. The lifter according to claim 8 which includes spacer means between said plate and said header to vary the aggressiveness of said lifter relative to a ground surface being traversed by the header and to adapt said lifter for attachment to various types of swathers.

10. The lifter according to claim 9 in which said ground engaging portion angles downwardly from the header attachment portion and includes a horizontal ground engaging under surface.

11. The lifter according to claim 8 in which said ground engaging portion angles downwardly from the header attachment portion and includes a horizontal ground engaging under surface.

12. The lifter according to claim 1 in which said ground engaging portion angles downwardly from the header attachment portion and includes a horizontal ground engaging under surface.

* * * * *